Aug. 9, 1932.  O. A. ROSS  1,870,468
SYSTEM OF REFLECTING MIRRORS OR THE LIKE
Filed Oct. 20, 1925
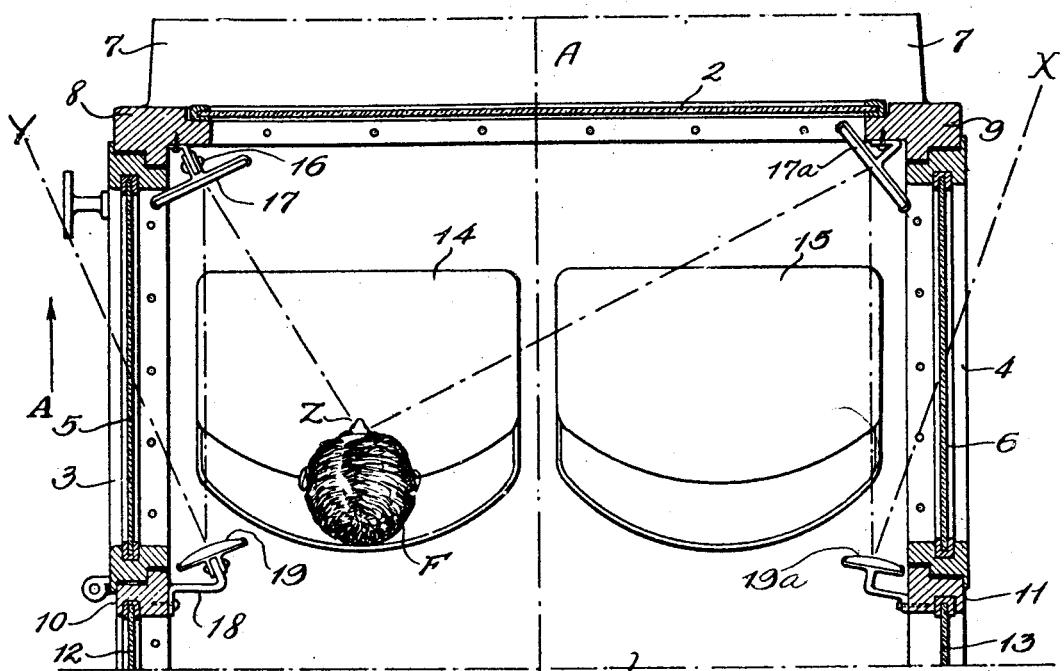
Fig.1.
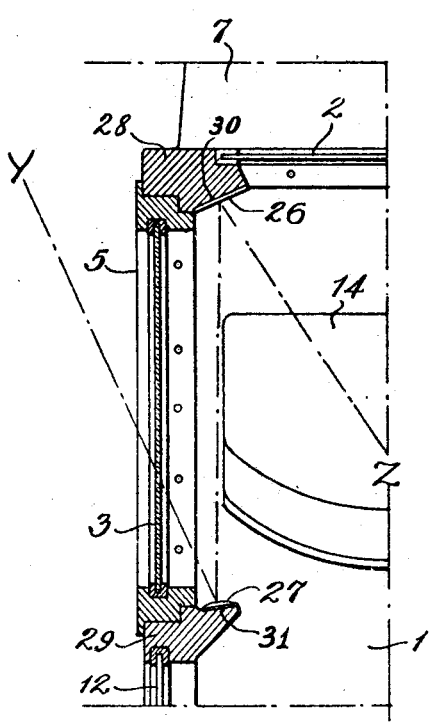
Fig.2.
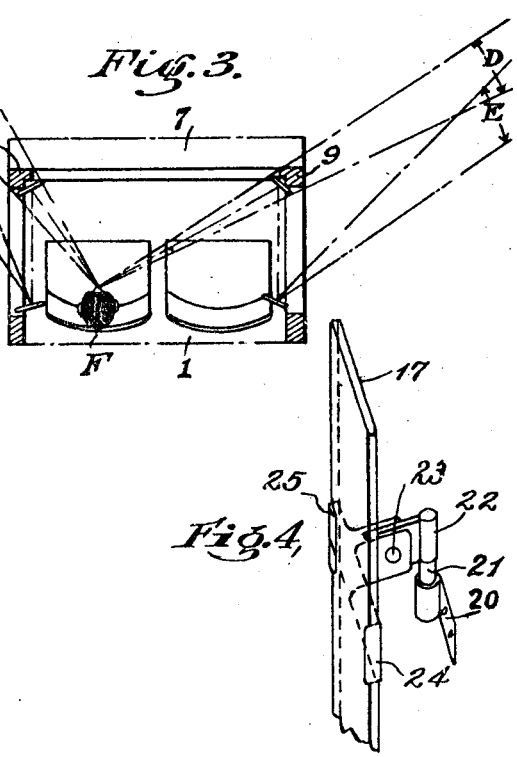
Fig.3.
Fig.4.
INVENTOR.
Oscar A. Ross Patented Aug. 9, 1932

1,870,468

UNITED STATES PATENT OFFICE

OSCAR A. ROSS, OF NEW YORK, N. Y.

SYSTEM OF REFLECTING MIRRORS OR THE LIKE

Application filed October 20, 1925. Serial No. 63,763.

This invention relates to a system of reflecting mirrors and more particularly to a system for use on automobiles, or similar vehicles of transportation wherein the operator of said automobile is located in a partial or total enclosure the frame work or body structure of which forms an obstruction to the vision of said operator, said obstruction being more commonly known as a "blind spot".

The prime object of this invention is to furnish a system of reflecting devices for automobiles, or similar vehicles of transportation whereby any obstructed view caused by a "blind spot" will be brought to full view of the operator of said vehicle, in other words this system will eliminate said "blind spots" whereby said operator will have full vision of the roadway before him. The aforesaid "blind spots" are particularly hazardous on approaching intersections at which time it is possible to have a transversely moving vehicle within the scope of the "blind spot" in this manner making a serious accident possible.

Another object is to form the bodies of motor vehicles whereby applicant's system of reflecting mirrors may be non-adjustably secured at proper angles of reflection to accomplish the results desired.

Other objects and advantages will appear as the description of the invention progresses, and the novel features of the invention will be pointed out in the appended claims.

This invention consists in the novel construction and arrangement of parts hereinafter described, delineated in the accompanying drawing, and particularly pointed out in that portion of the instrument wherein patentable novelty is claimed for certain and peculiar features of the system it being understood that, within the scope of what hereinafter thus is claimed, divers changes in the form, proportions, size and minor details of the structure may be made without departing from the spirit, or sacrificing any of the details of the invention.

In describing the invention in detail, reference is had to the accompanying drawing, wherein I have illustrated embodiments of the invention, and wherein like characters of reference refer to and designate corresponding parts throughout the several figures, and wherein:—

Figure 1 is a sectional plan view of a portion of an automobile body showing the interior, the portion above the operator's head being removed. Fig. 2 is a modified form of the invention shown in Fig. 1, and is taken on the same plane. Fig. 3 is a reduced view of Fig. 1, showing both sides of the body and in addition shows diagrammatically the functioning of the reflecting devices employed in the system. Fig. 4 is a perspective view of a modified form of mirror bracket and the mounting bracket therefor.

Referring to Fig. 1, the automobile, or vehicle body, as 1, hereinafter termed car body, is assumed to be facing, or travelling in the direction of the arrow A, and comprises that portion of the car body from just rear of the front seats to just forward of the wind shield, a portion of the cowl being shown, this portion being known as the chauffeur's, or operator's compartment, or section.

Car body 1, comprises wind shield 2, doors 3 and 4, having windows 5 and 6, also cowl 7, corner posts 8 and 9, and hinge posts 10 and 11, forming part of the car body frame, rear windows 12 and 13, operator's seat 14 and spare seat 15.

Pivotally attached to corner post 8, by bracket 16, is reflecting device 17. Pivotally attached to post 10, by bracket 18, is reflecting device 19. Brackets 16 and 18, may be modified to comprise a fixed support 20, having stud 21, to which is clamped member 22, bolt 23 serving to clamp clips 24 and 25, and member 22, together as shown by Fig. 4.

Reflecting devices 17a, and 19a, are similar to devices 17 and 19, but function through a different angle.

The operation of my improved system is as follows:—Referring to Fig. 3, the post 8, forms a blind spot to operator F, substantially as represented by the included angle B, any object located within this area is ordinarily invisible to the operator's vision, however with applicant's improved system the reflecting device 19, having a deflecting area substantially equal to, or larger than that area covered by post 8, and as represented in a horizontal plane by the included angle C, reflects all the objects within the aforesaid blinded area onto reflecting device 17, where it is readily seen by the operator F.

To reproduce all the objects appearing within the area concealed by the posts, as 8, and 9, and to obviate making the reflecting devices too larger and obstructive to occupants of the car body, the reflecting devices as 19 and 19a, are formed to optically enlarge the image received by the reflecting surfaces of said devices. This permits of the use of a smaller reflecting device without sacrificing any of the desired area to be seen.

Reflecting devices as 17, 17a, 19 and 19a are of a type preferably to be employed in car bodies which have been completed and placed in use before my improvement was conceived by me. When it is desired to install my system of reflecting devices in car bodies prior to their manufacture, and where a neat appearance is desired, the post 8, is modified substantially as shown by post 28, of Fig. 2, and post 10, is modified substantially as shown by post 29, of Fig. 2. The mirror supporting surface 30 of post 28 is formed at an angle with respect to the body 7, whereby upon mounting the mirror 26 thereon, the image reflected by mirror 27 will appear in the same relative position as if the object represented thereby were normally viewed in the absence of post 28, and the mirror supporting surface 31 of the modified post 29, is also formed at an angle with respect to the body 7, whereby upon mounting the mirror 27 thereon, the image received thereby will have the same relative width of field laterally as the object concealed by the post 28 when viewed by the occupant of seat 14, the mirror 26 being similar to mirror 17 and the mirror 27 being similar to mirror 19.

The center line of reflection through the reflecting devices 17 and 19, is represented by the center line Y—Z, and a similar center line through reflecting devices 17a and 19a, is represented by the line X—Z.

What I claim is as follows:—

1. In combination with a vehicle having a substantially enclosed body supporting a driver's seat therein, the body being formed with opaque members positioned between the wind-shield and the entrance doors thereof whereby a person normally occupying the seat will have a partially obstructed field of vision down a street which is disposed to the front of the vehicle and laterally of the street being travelled upon, the body also having posts rearwardly of the doors and extending between the floor portion and the roof portions thereof, of light deflecting members supported by the posts, reflecting surfaces formed thereon positioned to receive an image of the objects in the field obstructed by the opaque members, secondary light deflecting members supported by the opaque members in view of the occupant of the seat, and reflecting surfaces formed thereon positioned to receive the image depicted by the reflecting surfaces of the primary light deflecting members whereby the occupant of the seat will see the objects in the obstructed field of vision in the same manner as if the opaque members were absent.

2. The combination with a vehicle having a substantially opaque body member and a seat member, said members being so relatively positioned that a person normally occupying the seat member will have a partially obstructed field of vision down a street which is disposed to the front of the vehicle and laterally of the street being travelled upon, of a primary light deflecting member supported by the body having a reflecting surface formed thereon positioned to receive the image of the objects in the obstructed field, a secondary light deflecting member supported by the opaque member having a reflecting surface formed thereon positioned in view of the occupant of the seat member arranged to receive the image depicted by the primary member, the light deflecting members being positioned in substantially fixed spaced relation one to the other whereby the image depicted by the primary deflecting member is reduced in size by reflection to the secondary deflecting member, and an optical system positioned between the reflecting surfaces of the light deflecting members arranged to enlarge the image depicted by the primary deflecting member whereby the image depicted by the secondary deflecting member will be of substantially the same relative size as if the objects were viewed if the opaque member were absent.

3. The combination with a vehicle having a substantially opaque body member and a seat member, the members being so positioned with respect to each other that a person normally occupying the seat member will have a partially obstructed field of vision down a street which is disposed in front of the vehicle and laterally of the street being travelled upon, of a primary light deflecting member supported by the body rearwardly of the seat member, a reflecting surface formed thereon positioned to receive the image of the objects in the obstructed field, a secondary light deflecting member supported by the opaque member in the plane of the obstructed field, a reflecting surface formed thereon positioned in view of the occupant of the seat member and arranged to receive the image depicted by the primary light deflecting member, the light deflecting members being positioned in substantially fixed spaced relation one to the other whereby the image depicted by the primary member is reduced in size by reflection to the secondary member, and an optical system positioned between the reflecting surfaces of the deflecting members arranged to enlarge the image depicted by the primary member whereby the image depicted by the secondary member will be of substantially the same relative size as if the objects were viewed by the occupant of the seat member if the opaque member were absent.

4. The combination with a vehicle having a substantially enclosed body supporting a driver's seat therein, the body being formed with opaque members positioned between the wind-shield and the entrance doors thereof whereby a person normally occupying the seat will have a partially obstructed field of vision down a street which is disposed in front of the vehicle and laterally of the street being travelled upon, the body also having post members positioned rearwardly of the seat extending between the floor portion and the roof portion of the body, of light deflecting members supported by the post members, reflecting surfaces formed thereon positioned to depict an image of the objects in the obstructed field, secondary light deflecting members supported by the opaque members in view of the occupant of the seat, reflecting surfaces formed thereon positioned to receive the image depicted by the primary members, the light deflecting members being positioned in substantially fixed spaced relation one to the other whereby the image depicted by the primary member is reduced in size by reflection to the secondary member, and an optical system positioned between the reflecting surfaces of the primary and secondary light deflecting members arranged to enlarge the image depicted by the primary member whereby the image depicted by the secondary member will be of substantially the same relative size as if the objects were viewed by the occupant of the seat if the opaque member were absent.

5. The combination with a vehicle having a substantially enclosed body, the body having a substantially opaque member and a seat member, the members being so positioned relatively that a person normally occupying the seat member will have a partially obstructed field of vision down a street which is disposed in front of the vehicle and laterally of the street travelled upon, of a primary light deflecting member having a reflecting surface thereon, a secondary light deflecting member having a reflecting surface thereon, means formed integrally with the body structure for rigidly positioning the primary member whereby the reflecting surface thereof will be positioned to depict an image of the objects in the obstructed field, and means formed integrally with the opaque member for rigidly positioning the secondary member whereby the reflecting surface thereof will be positioned to reflectingly depict the image of the primary member within the vision of a person normally occupying the seat member.

6. The combination with a vehicle having a substantially enclosed body containing a seat member therein, the body having non-movable substantially vertical portions connecting the floor and roof portions thereof, of a light deflecting member, a reflecting surface formed thereon arranged to be positioned to depict an image of a portion of the roadway upon which the vehicle is travelling normally obscured from an occupant of the seat member, a mounting portion formed integrally with the vertical portions, and a mounting surface formed thereon positioned in a plane substantially parallel to the plane of the reflecting surface of the light deflecting member when the member is positioned to depict the image of the obscured portion of the roadway to the occupant of the seat member.

7. The combination with a vehicle having a substantially enclosed body containing a seat member therein, the body having integrally formed longitudinal portions thereon, of a light deflecting member, a reflecting surface formed thereon positioned in a plane to depict an image of a portion of the roadway upon which the vehicle is travelling normally obscured from the occupant of the seat member, a mounting portion formed integrally with the longitudinal portions, and a mounting face formed thereon positioned in a plane substantially parallel to the plane of the reflecting surface of the light deflecting member when the member is positioned to depict the image of the obscured portion of the roadway to the occupant of the seat member.

8. The combination with a vehicle having a substantially enclosed body containing a seat member therein, the body having fixed frame portions formed thereon, of a light deflecting member, a reflecting surface formed thereon positioned in a plane to depict an image of a portion of the roadway upon which the vehicle is travelling, the roadway portion being obscured from a person normally occupying the seat member, a mounting portion formed integrally with the fixed frame portions, and a mounting surface formed thereon in a plane substantially parallel to the plane of the reflecting surface of the light deflecting member whereby the member may be rigidly secured to the mounting surface for depicting an image of the obscured portion of the roadway.

9. The combination with a vehicle having a substantially enclosed body supporting a seat member therein, the body having fixed frame portions formed thereon positioned to produce an obscured field to the vision of a person normally occupying the seat member, of a light directing member having a reflecting surface formed thereon positioned in a plane to depict objects of the obstructed field within the vision of the occupant of the seat member, a mounting portion formed on the frame portions, a mounting surface formed on the mounting portions positioned in a plane substantially parallel to the plane of the reflecting surface of the light deflecting member whereby the member may be rigidly secured to the mounting surface, and light directing means supported by the body for reflecting the objects of the obstructed field into the light deflecting member whereby the seat occupant may visually observe the objects in the same manner as if the frame portions were absent.

10. The combination with a vehicle having a substantially enclosed body supporting a driver's seat therein, the body having fixed frame portions formed thereon, certain of the frame portions being positioned with respect to the seat member whereby a person normally occupying the seat member will have a partially obstructed field of vision down a roadway which is disposed in front of the vehicle and laterally of the roadway being travelled upon, a primary light deflecting member having a reflecting surface formed thereon positioned in a plane with respect to the obstructed field whereby the objects therein will appear on the reflecting surface thereof, a mounting portion formed on certain frame portions, a mounting surface formed thereon positioned in a plane substantially parallel to the plane of the reflecting surface, whereby the light deflecting member may be fixedly secured thereto, a secondary light deflecting member having a reflecting surface formed thereon positioned in a plane to reflect the image depicted by the primary member into the vision of an occupant of the seat member, a mounting surface formed on the obscuring frame portions, and a mounting surface formed thereon positioned in a plane substantially parallel to the plane of the reflecting surface of the secondary member whereby the member may be fixedly secured thereto for depicting the objects to the seat occupant.

11. The combination with a vehicle having a substantially enclosed body supporting a seat member therein, the body being formed with fixed frame portions thereon, of a light deflecting member having a light reflecting surface formed thereon positioned in a plane to depict objects on the roadway normally beyond the vision of a person normally occupying the seat member as the vehicle advances down a roadway, mounting portions formed on certain of the frame portions, and a mounting surface formed on the mounting portions positioned in a plane substantially parallel to the plane of the reflecting surface of the light deflecting member whereby the member may be fixedly secured to the mounting surface for depicting the objects to the seat occupant.

Signed at New York city, in the county of New York and State of New York, this 19th day of October, A. D. 1925.

OSCAR A. ROSS.